United States Patent [19]
Brabetz et al.

[11] Patent Number: 4,532,295
[45] Date of Patent: Jul. 30, 1985

[54] POLYMERIZATION PROCESS FOR AQUEOUS POLYMER DISPERSIONS OF VINYL ESTERS AND ETHYLENIC MONOMERS

[75] Inventors: Hartmut Brabetz; Herbert Eck; Reinhard Jira; Heinrich Hopf, all of Burghausen, Fed. Rep. of Germany

[73] Assignee: Wacker-Chemie GmbH, Fed. Rep. of Germany

[21] Appl. No.: 625,672

[22] Filed: Jun. 28, 1984

[30] Foreign Application Priority Data

Jul. 1, 1983 [DE] Fed. Rep. of Germany ....... 3323851

[51] Int. Cl.$^3$ ..................... C08F 210/02; C08L 31/04; C09J 3/14; C04B 13/24
[52] U.S. Cl. ..................................... 524/827; 524/716; 524/734; 524/798; 524/804; 526/208; 526/227; 526/228; 526/910; 526/911; 526/915
[58] Field of Search ............... 524/827, 804, 798, 734, 524/716; 526/208, 227, 228, 910, 911, 915

[56] References Cited

U.S. PATENT DOCUMENTS

| 3,622,535 | 11/1971 | Greenley et al. | 524/790 |
|---|---|---|---|
| 3,632,535 | 1/1972 | Gramera et al. | 156/328 |
| 3,769,248 | 10/1973 | Kovats | 524/734 |
| 4,035,329 | 7/1977 | Wiest et al. | 526/331 |
| 4,118,556 | 10/1978 | König et al. | 526/915 |
| 4,219,454 | 8/1980 | Iacoviello et al. | 526/331 |
| 4,322,322 | 3/1982 | Lambrechts et al. | 524/734 |
| 4,322,516 | 3/1982 | Wiest et al. | 526/307.7 |

FOREIGN PATENT DOCUMENTS

| 590780 | 1/1960 | Canada | 524/734 |
|---|---|---|---|
| EP21542 | 1/1981 | European Pat. Off. | |

Primary Examiner—Ronald W. Griffin
Attorney, Agent, or Firm—Bierman, Peroff & Muserlian

[57] ABSTRACT

A process for the preparation of aqueous polymer dispersions comprising polymerizing vinyl esters and up to 50% by weight of the total monomer of compounds with unsaturated ethylenic bonds at a temperature of 10° to 100° C. in the presence of an at least partially water-soluble free-radical initiator and at least one starch member of the group consisting of cyanalkylated starch, hydroxyalkylated starch and carboxyalkylated starch and optionally present conventional adjuvants with the starting mixture containing not more than one-third of the total monomers and the remaining monomers being added by metering during the polymerization, the initiators being at least one member of the group consisting of hydrogen peroxide and organic hydroperoxides in an amount of at least 30 mmol per kg of total monomer mixture and optionally present water-soluble reducing agent and the amount of starch being at least 1% by weight based on the total monomer weight.

12 Claims, No Drawings

POLYMERIZATION PROCESS FOR AQUEOUS POLYMER DISPERSIONS OF VINYL ESTERS AND ETHYLENIC MONOMERS

STATE OF THE ART

The use of starch or starch derivatives as protective colloids for the preparation of aqueous polymer dispersions has been proposed in the art. For example, a process for the preparation of aqueous vinyl acetate polymer dispersions is described in European Pat. No. A-21 542 and U.S. Pat. No. 3,769,248 wherein the monomer and the initiator are added to an aqueous solution of an emulsifying agent and hydroxyethyl starch and/or hydroxypropyl starch with a degree of substitution exceeding 0.8.

U.S. Pat. No. 3,622,535 describes the preparation of aqueous vinyl acetate polymer dispersions in the presence of certain oxidized starches. The use of other starch derivatives is expressly discouraged since the resulting products would have unsatisfactory characteristics. Since the presence of an emulsifying agent is undesirable for various uses of polymer dispersions, a process for the preparation of aqueous polymer dispersions that will work without the addition of emulsifying agents for the polymerization is desired.

OBJECTS OF THE INVENTION

It is an object of the invention to provide a process for the polymerization of all well-known monomers to obtain dispersions free of grit and coagulum, which have the stability also required today against, e.g., shearing, temperature influence, electrolyte addition.

It is a further object of the invention to provide aqueous polymer dispersions resistant to borax solutions and suitable for trouble-free processing in cement containing materials.

It is another object of the invention to provide novel aqueous dispersions particularly adapted to produce polymer powders which are easily redispersible.

These and other objects and advantages of the invention will become obvious from the following detailed description.

THE INVENTION

The novel process of the invention for the preparation of aqueous polymer dispersions comprises polymerizing vinyl esters and up to 50% by weight of the total monomer of compounds with unsaturated ethylenic bonds at a temperature of 10° to 100° C. in the presence of an at least partially water-soluble free-radical initiator and at least one starch member of the group consisting of cyanalkylated starch, hydroxyalkylated starch and carboxyalkylated starch and optionally present conventional adjuvants with the starting mixture containing not more than one-third of the total monomers and the remaining monomers being added by metering during the polymerization, the initiators being at least one member of the group consisting of hydrogen peroxide and organic hydroperoxides in an amount of at least 30 mmol per kg of total monomer mixture and optionally present water-soluble reducing agents and the amount of starch being at least 1% by weight based on the total monomer weight.

Examples of vinyl esters are vinyl esters of alkanoic acids of 1 to 19 carbon atoms, especially vinyl acetate. Other comonomers include (meth)acrylate of alkanols of 1 to 18 carbon atoms, methacrylonitrile, vinyl and alkyl esters of aliphatic, araliphatic or aromatic carboxylic acids of 1 to 18 carbon atoms, alkenes of 2 to 4 carbon atoms and vinyl halides.

They can in many cases be polymerized individually or, if the parameters of copolymerization permit, copolymerized in admixture, if needed with other monomers, especially with alkenes such as ethylene, propylene, isobutylene, with acrylic acid, methacrylic acid, itaconic acid, crotonic acid, fumaric acid and maleic acid, their mono- and/or diesters with the alcohols mentioned above, their amides or nitriles.

Vinyl sulfonates, monoesters of di- or polyhydroxyl compounds with (meth)acrylic acid or crotonic acid, N-vinyl-2-pyrrolidone, vinyl-pyridine, N-vinyl lactones, vinyl- or allyl(di)acetyl acetate, vinyl- or (meth)acryloxyalkoxy silanes, vinyl or allyl compounds of glycidyl alcohol, α-chloroalkylcarboxylic acids and dichlorotriazines as well as olefinically unsaturated N-methylol amides such as N-methylol (meth)acrylamide, N-methylol allyl carbamate, N-methylol allyl ether, Mannich bases, N-methylol ester and N-methylol ether of N-methylol (meth)acrylamide may also be used as comonomers.

Examples of bi- or polyfunctional comonomers include: divinyl and diallyl ethers of glycols, divinyl and diallyl esters of saturated dicarboxylic acids, polyvinyl and polyallyl esters of polycarboxylic acids, di- and polyesters of di- and polyhydroxyl compounds with (meth)acrylic acid, vinyl and allyl esters of (meth)acrylic, crotonic, maleic and fumaric acids and divinyl benzene. The said comonomers can be copolymerized with the initially mentioned monomers or their mixtures if the parameters of copolymerization and the desired characteristics of the dispersion of the copolymer permit. Their total amount should not exceed 50% of the total monomer weight and the amount of water-soluble, functional comonomers is preferably not more than 10% by weight of the monomer mixture.

Examples of vinyl esters of alkanoic acids of 1 to 19 carbon atoms are vinyl acetate, vinyl propionate, vinyl hexanoate, vinyl laurate, vinyl stearate, vinyl esters of alkyl carboxylic acids branched in the α-position which are prepared by the so-called Koch synthesis (esters of Versatic acids of Shell AG).

Examples of monomers that can be homopolymerized or copolymerized according to the invention include methyl(meth)acrylate, ethyl(meth)acrylate, propyl(meth)acrylate, butyl(meth)acrylate, ethylhexyl(meth)acrylate, lauryl(meth)acrylate, cyclobutadiene, vinylidene chloride, vinyl formate, the allyl esters corresponding to the mentioned vinyl esters, vinyl fluoride, vinyl chloride and vinyl bromide.

Suitable at least partially water-soluble, free-radical initiators which are added as redox-initiator system, preferably in combination with water-soluble reducing agents, are hydrogen peroxide and/or organic hydroperoxides with the use of alkyl hydroperoxides of up to 8 carbon atoms and/or aralkyl hydroperoxides of 6 to 15 carbon atoms being preferred. Specific initiators include isopropyl hydroperoxide, tert-.butyl hydroperoxide, cumene hydroperoxide, diisopropylphenyl hydroperoxide, pinane hydroperoxide, p-nitrocumene hydroperoxide, p-tert.-butylphenyl hydroperoxide, tert-amyl hydroperoxide, 2,5-dimethyl-hexan-2,5-dihydroperoxide.

Preferred reducing agents include reducing sulfur compounds, especially salts of sulfoxylic acid and sulfurous acid, as well as ascorbic acid. Sodium and zinc formaldehyde sulfoxylate, sodium bisulfite and sodium sulfite are specific preferred sulphur compounds.

The said oxidizing and reducing agents can be used alone or as mixtures and the oxidizing component is preferably used in an excess with respect to the reducing component. This may be achieved e.g., by placing the oxidizing agent completely or partly in the reaction vessel and metering in the reducing agent and, if appropriate, the remainder of the oxidizing component, preferably at the rate at which they are consumed during the polymerization. However, it is understood that both components of the redox system can also be added by metering during polymerization.

The peroxide initiator is used in amounts of at least 30 mmol, preferably at least 45 mmol, per kg of the total monomer mixture and the amount of the optionally used reducing agent is preferably 15 to 95 mol %, especially 15 to 80 mol %, calculated with respect to the peroxide compound. In this case, the water and the reaction components and compounds dissolved or dispersed in it are called the reaction mixture. The upper limit of the concentration of the initiator depends on the type of monomer used and especially on the chosen reaction temperature and the intended degree of polymerization. The protective colloid also has a certain influence on the amount of initiator to be used but the optimal amounts can be readily determined by a few preliminary experiments. Generally, 2 weight %, calculated with respect to the total amount of monomers, will be adequate.

Examples of the starches which may be used individually or as mixtures are cyanalkyl ethers of starches with 1 to 6 alkyl carbon atoms, hydroxyalkyl ethers of starch of 1 to 6 alkyl carbon atoms such as hydroxyethyl ether starch, hydroxypropyl ethers, and hydroxybutyl ether starch and carboxymethylated starches. Suitable starting materials for the said starches are hydrolyzed starches such as those degradated by acid hydrolysis and natural starches. No special starting starches are required and they may be of any plant origin such as from corn, wheat, potatoes, tapioca, rice, sage and sorghum.

The cyanalkylation, hydroxyalklation and carboxyalkylation are well known procedures and the degree of substitution is not crucial and preferably up to about 2% is sufficient. Many of the said starch derivatives are commercially available. The use of hydroxyalkylated starches is preferred for dispersions to be used in cement containing compositions.

The protective colloids of a modified starch derivative described above are used in amounts of at least 1.0 weight %, preferably at least 1.5 weight %, calculated with respect to the total weight of the monomer mixture. Preferred is the addition of at least 0.5 weight % of these protective colloids, calculated with respect to the total monomer, as the minimum amount of starch or starch derivative necessary for the stabilization of the entire batch, to the reaction mixture before the beginning of the polymerization.

The viscosity of the final dispersion can be determined very simply by the amount of protective colloid placed in the reaction vessel for a given protective colloid and given temperature, e.g., the viscosity can be greatly increased by adding initially the total amount of starch or lowered by increasing the amount of protective colloid added during polymerization. The upper limit of the amount of protective colloid is determined by the intended use of the final polymer dispersion and not by the polymerization process of the invention. Obviously, the viscosity of the starch also limits the amount that can be used and this becomes apparent, e.g., from the fact that this limit can be further extended by the use of kneading units for the polymerization.

"Highly viscous" types of modified starch can be used, e.g., preferably in amounts of up to 5 weight %, preferably about 3 weight %, while types with very "low viscosity" can be used preferably in amounts up to 100 weight %, especially up to 50 weight %, calculated with respect to the total amount weight. Types of "medium viscosity" between those mentioned can be used in amounts from preferably 1.5 to 50 weight %. Some types of modified starch are known to inhibit polymerization. They are preferably avoided or used only in small amounts and it is advisable to test their suitability in a small-scale preliminary trial.

The polymerization process of the invention is performed at 10° to 100° C., preferably 35° to 80° C., and preferably at pressures of up to 200 bar. When no ethylene is used, the polymerization is preferably performed at not more than the autogenous pressure of the monomers at the selected reaction temperature. When ethylene is used, pressures of up to 100 bar are adequate in an especially preferred practical example.

When ethylene is used in the polymerization, it can be placed completely in the reaction vessel at the start, or part of it can be added during polymerization. A specific, desired pressure is preferably set before the polymerization and then kept constant throughout the polymerization, if needed by further addition of ethylene under pressure. Naturally, the ethylene pressure can be varied during the polymerization reaction, if this is desired such as for the preparation of polymers of varying composition.

The other monomers or comonomers are placed in the reaction vessel at the beginning in amounts not exceeding one third % of the total weight with the remainder being added during the polymerization, preferably at the rate of consumption. The addition can be separately, as a mixture and/or as a pre-emulsion. Maintaining the total monomer concentration of these other monomers in the reaction mixture below 20 weight %, preferably at not more than 15 weight %, of the total weight of the reaction mixture was also found to be advantageous. When ethylene is copolymerized, particularly when copolymers with more than 10 weight % ethylene units added by polymerization are desired, the total concentration of these other comonomers, i.e. of the unsaturated esters, halogen substituted ethylenes etc., is kept preferably at not more than 10 weight %, especially not more than 5 weight %, of the total weight of the reaction mixture. The monomers may be added individually, mixed and/or as pre-emulsion or, if needed, as aqueous solutions.

Other optional conventional adjuvants used in the usual amounts are molecular weight regulators, protective colloids such as polyvinyl alcohols such as partially saponified polyvinyl acetate, cellulose derivatives and similar substances and emulsifying agents. However, these dispersing adjuvants and dispersion stabilizers are added, if at all, to the final dispersion after the end of the polymerization since they may otherwise frequently enter in an undesirable manner into the polymerization or modify the products in an undesirable way. Upon the completion of the polymerization, other usual adjuvants can be added in the usual amounts to the dispersions obtained by the invention and include film-forming adjuvants, softening agents, pesticides, stabilizers against thermal or electromagnetic damage a.m.m.

The dispersions prepared by the invention can be used as such for the preparation of adhesive such as especially paper, foil, water resistant wood glues, as paint, textile or paper filler, in the construction industry such as adjuvant to hydraulically setting materials, especially stable cement and concrete materials, but particularly for the preparation of redispersible plastic powders which are especially suitable for wallpaper paste and used in the construction industry. These powders are produced by spray-drying or drum-drying or suction-filter-drying by known procedures and thus do not need to be described here in detail with the use of the powders, based on the dispersions of the invention. However, the polymers can also be precipitated or isolated by other known methods.

In the following examples there are described several preferred embodiments to illustrate the invention. However, it should be understood that the invention is not intended to be limited to the specific embodiments.

EXAMPLES

In the following examples reported in the Tables, the amounts and concentrations are by weight and the percentages of the components of the initiator systems, monomers and modified starch components are calculated on total monomer weight without ethylene and the solids content and remaining monomers are calculated on the total weight of the dispersions. The wet residue is reported in grams per 1.5 kg batch and the viscosities were determined with Brookfield viscosimeter in $min^{-1}$/mPas or with an Epprecht rheometer (beaker and measuring speed are recorded). The mean particle sizes were measured with a coulter ®Nanosizer TM in nm and were recorded after the Polydispersity Index P.

Examples 1 to 9 illustrate the process of the invention and Examples A to D are comparison examples to show the advantageous features of the process. Water, starch, if needed portions of the catalyst system, if needed portions of the monomers and, if needed, additives were placed in a cylindrical reaction vessel with a bottom stirrer, a reflux condenser, a thermometer and feeding funnels for the initiator, monomer mixture and buffer solution as well as an attachment for the removal of samples. The mixture was stirred to raise it up to the reaction temperature and the remaining monomers, catalyst system and buffer were added by metering over about 2 hours. Upon the completion of the polymerization, the material was allowed to after-polymerize, if needed, for 30 minutes in the known manner with continued addition of a water-soluble initiator.

Metering of the monomers except ethylene was adjusted to keep the concentration of the monomers in the reaction mixture below 20 weight %. Further examples can be found in the following table. The abbreviations are explained below:

| v | placed in the reaction vessel | d | metered |
|---|---|---|---|
| AA | acrylamide | MA | methyl acrylate |
| AAA | allyl acetoacetate | OA | 2-ethylhexyl acrylate |
| AB | butyl acrylate | VA | vinyl acetate |
| AS | acrylic acid | Veo | VeoVa$^{(R)}$10, Vinylversatat$^{(R)}$ |
| F.G. | solids content | R.M. | remaining monomer content |
| TBHP | tert-butyl hydroperoxide | $H_2O_2$ | hydrogen peroxide |
| DTBP | di-tert-butyl peroxide | CHP | cumene hydroperoxide |
| APS | ammonium persulfate | NFS | sodium formaldehyde sulfoxylate |
| LPO | dilauroyl peroxide | NS | sodium sulfite |

Commercial modified starches were used:

I: Mixture of approx. 65% of a cyanethylated and of approx. 35% of a hydroxyethylated potato starch with a respective degree of substitution of 0.04 to 0.05; Perfectamyl A 6954; Avebe;

II: starch of hydroxypropyl ether, degree of substitution approx. 1; HP 68; Amylum;

III: cold-water-soluble ether of corn starch, degree of substitution approx. 0.5; Lab 302; Roquette;

IV: carboxymethyl starch, degree of substitution approx. 0.3; experimental product CMA; Amylum;

V: carboxymethyl starch, degree of substitution approx 0.3; Avetex CM 34; Avebe.

| No. | Monomers (%) | Type of starch (%) | Catalyst system (%) | T (°C.) | pH |
|---|---|---|---|---|---|
| 1 | VA; d | I (5 v) | TBHP(1 v), NFS + FS (je 0.4 d) | 70 | 4.3 |
| 2 | VA (98) + AAA (2); d | II (3 v) | TBHP (1 v), NFS + FS (je 0.3 d) | 70 | 4.6 |
| 3 | VA; d | I (3 v) | TBHP (0.9 v), NFS + FS (je 0.3 d) | 70 | 5.1 |
| 4 | VA; d | III (3 v) | TBHP (0.9 v), NFS + FS (je 0.3 d) | 70 | 5.3 |
| 5 | VA; d | IV (4 v) | TBHP (0.9 v), NFS + NS (je 0.3 d) | 70 | 4.2 |
| 6 | VA; d | IV (1.5 v) + V (0.5 v) | TBHP (0.9 v), NFS + NS (je 0.2 d) | 70 | 5.4 |
| 7 | VA (80) + AB (20); d | I (4 v) | $H_2O_2$ (0.3 v), NFS + FS (je 0.2 d) | 70 | 4.1 |
| 8 | VA (60) + AB (20) + MA (13) + Veo (5) + AS (1) + AA (1); d | I (2 v) | CHP (1 v), NFS + FS (je 0.3 d) | 70 | 5.3 |
| A | VA (95) + OA (5); d | V (4 v) | APS (0.4 v) | 78 | — |
| B | VA (95) + OA (5); d | V (1 v) | APS (0.4 v) | 70 | 4.8 |
| 9 | VA (95) + OA (5); d | V (1 v) | TBHP (0.9 v), NFS − NS (je 0.3 d) | 70 | 4.0 |
| C | VA; d | III (3 v) | LPO (1 v) | 60 | 6.0 |
| D | VA; d | III (3 v) | DTBP (1 v), NFS + NS (je 0.4 d) | 70 | 5.5 |

| No. | FG (%) | R.M. (%) | Spreading | P/(nm) | Viscosity (mPas) | (mPas) | (mPas) |
|---|---|---|---|---|---|---|---|
| 1 | 49.3 | 0.17 | very clear | 6/600 | DI 32840 | DII 12990 | DIII 5620 |
| 2 | 45.1 | 0.4 | slightly turbid | — | — | — | DIII 5250 |
| 3 | 47.4 | 0.27 | very clear | 6/620 | CI 16530 | CII 6750 | CIII 3000 |
| 4 | 52.4 | 0.2 | clear | 0/745 | CI 154500 | CII 51900 | CIII 32000 |

| | | | -continued | | | | |
|---|---|---|---|---|---|---|---|
| 5 | 53.5 | 0.5 | clear | 2/740 | CI 18900 | CII 6460 | CIII 4210 |
| 6 | 45.6 | 6.6 | very clear | | | | |
| 7 | 52.4 | 1.0 | very clear | — | *2/ 890 | *10/ 590 | — |
| 8 | 47.9 | 0.5 | clear | — | *2/ 780 | *10/ 620 | *20/ 430 |
| A | 51.0 | 0.1 | dots | | strongly rheopex | | |
| B | 50.7 | 0.2 | dots and cont'g coaguium | | | | |
| 9 | 51.3 | 0.3 | clear | | BI 1300 | BII 670 | BIII 370 |
| C | | | typical suspension polymerization | | | | |
| D | | | typical suspension polymerization | | | | |

Symbol "je" means "each"

Various modifications of the process of the invention may be made without departing from the spirit or scope thereof and it is to be understood that the invention is intended to be limited only as defined in the appended claims.

What we claim is:

1. A process for the preparation of aqueous polymer dispersions consisting essentially of polymerizing vinyl esters and up to 50% by weight of the total monomer of compounds with unsaturated ethylenic bonds at a temperature of 10° to 100° C. in the presence of an at least partially water-soluble free-radical initiator and of at least one starch member of the group consisting of cyanalkylated starch, hydroxyalkylated starch and carboxyalkylated starch with the starting mixture containing not more than one third of the total monomers and the remaining monomers being added by metering during the polymerization, the initiators being at least one member of the group consisting of hydrogen peroxide and organic hydroperoxides in an amount of at least 30 mmol per kg of total monomer mixture and the amount of starch being at least 1% by weight based on the total monomer weight.

2. The process of claim 1 wherein the peroxide initiator is used in combination with a member selected from the group consisting of ascorbic acid and reducing sulfur compounds.

3. The process of claim 2 wherein the peroxide initiator is placed in the reaction mixture and polymerization is controlled by addition of the reducing agent.

4. The process of claim 1 wherein the initiator is at least one member of the group consisting of alkyl hydroperoxides and aralkyl hydroperoxides.

5. The process of claim 1 wherein the amount of starch additive is added in an amount of at least 0.5% by weight of the monomer mixture before polymerization is started.

6. The process of claim 1 wherein the amount of initiator is at least 45 mmol per kg of total monomer.

7. The process of claim 1 using 15 to 95 mol % of reducing agent based on the initiator.

8. An aqueous polymer dispersion produced by the process of claim 1.

9. A process for the preparation of aqueous polymer dispersions consisting essentially of polymerizing vinyl esters and up to 50% by weight of the total monomer of compounds with unsaturated ethylenic bonds at a temperature of 10° to 100° C. in the presence of an at least partially water-soluble free radical initiator and at least one starch member of the group consisting of cyanalkylated starch, hydroxyalkylated starch and carboxyalkylated starch and adjuvants, the starting mixture containing not more than one third of the total monomers and the remaining monomers being added by metering during the polymerization, the initiators being at least one member of the group consisting of hydrogen peroxide and organic hydroperoxides in an amount of at least 30 mmol per kg of total monomer mixture and the amount of starch being at least 1% by weight based on the total monomer weight.

10. An aqueous polymer dispersion produced by the process of claim 9.

11. A process for the preparation of aqueous polymer dispersions consisting essentially of polymerizing vinyl esters and up to 50% by weight of the total monomer of compounds with unsaturated ethylenic bonds at a temperature of 10° to 100° C. in the presence of an at least partially water-soluble free-radical initiator and at least one starch member of the group consisting of cyanalkylated starch, hydroxyalkylated starch and carboxyalkylated starch with the starting mixture containing not more than one third of the total monomers and the remaining monomers being added by metering during the polymerization, the initiators being at least one member of the group consisting of hydrogen peroxide and organic hydroperoxides in an amount of at least 30 mmol per kg of total monomer mixture and water-soluble reducing agent and the amount of starch being at least 1% by weight based on the total monomer weight.

12. An aqueous polymer dispersion produced by the process of claim 11.

* * * * *